(12) United States Patent
Kumar et al.

(10) Patent No.: US 10,509,680 B2
(45) Date of Patent: Dec. 17, 2019

(54) METHODS, SYSTEMS AND APPARATUS TO PERFORM A WORKFLOW IN A SOFTWARE DEFINED DATA CENTER

(71) Applicant: VMWARE, INC., Palo Alto, CA (US)

(72) Inventors: Prafull Kumar, Palo Alto, CA (US); Konstantin Ivanov Spirov, Sofia (BG)

(73) Assignee: VMWARE, INC., Palo Alto, CA (US)

(*) Notice: Subject to any disclaimer, the term of this patent is extended or adjusted under 35 U.S.C. 154(b) by 88 days.

(21) Appl. No.: 15/414,653

(22) Filed: Jan. 25, 2017

(65) Prior Publication Data

US 2018/0143854 A1   May 24, 2018

(30) Foreign Application Priority Data

Nov. 23, 2016 (IN) .............................. 201641039950

(51) Int. Cl.
*G06F 9/50* (2006.01)
*G06F 9/48* (2006.01)

(52) U.S. Cl.
CPC ............ *G06F 9/505* (2013.01); *G06F 9/4881* (2013.01)

(58) Field of Classification Search
CPC ....................................................... G06F 9/505
See application file for complete search history.

(56) References Cited

U.S. PATENT DOCUMENTS

| | | | | |
|---|---|---|---|---|
| 2003/0191795 | A1* | 10/2003 | Bernardin | G06F 9/505 718/105 |
| 2010/0211815 | A1* | 8/2010 | Mankovskii | G06F 11/0709 714/2 |
| 2011/0035757 | A1* | 2/2011 | Comer | G06F 9/485 719/314 |
| 2012/0124431 | A1* | 5/2012 | Bauer | H04L 41/0663 714/55 |
| 2015/0058659 | A1* | 2/2015 | Brundridge | G06F 11/2025 714/4.11 |
| 2015/0186181 | A1* | 7/2015 | Gleyzer | G06F 11/1446 718/102 |
| 2016/0212061 | A1* | 7/2016 | Birkestrand | H04L 67/10 |
| 2016/0285966 | A1* | 9/2016 | Brech | H04L 41/0893 |
| 2016/0357610 | A1* | 12/2016 | Bartfai-Walcott | G06F 9/5027 |

* cited by examiner

*Primary Examiner* — Sisley N Kim
(74) *Attorney, Agent, or Firm* — Hanley, Flight & Zimmerman, LLC

(57) ABSTRACT

Methods and apparatus to perform a workflow in a software defined data center are disclosed herein. An example software defined data center includes a first workflow engine associated with a first processor to execute a workflow and to generate status information identifying the status of tasks included in the workflow and further includes a status tracker associated with a second processor. The status tracker collects and stores the status information. Additionally, the software defined data center includes a monitor to generate a signal when the first processor is no longer operational, and a second workflow engine associated with a third processor. The second workflow engine begins executing the workflow in response to the signal from the monitor based on status information collected and stored by the status tracker.

20 Claims, 10 Drawing Sheets

METHODS, SYSTEMS AND APPARATUS TO PERFORM A WORKFLOW IN A SOFTWARE DEFINED DATA CENTER

RELATED APPLICATIONS

Benefit is claimed under 35 U.S.C. 119(a)-(d) to Foreign Application Serial No. 201641039950 filed in India entitled "METHODS, SYSTEMS AND APPARATUS TO PERFORM A WORKFLOW IN A SOFTWARE DEFINED DATA CENTER", on Nov. 23, 2016, by VMware, Inc., which is herein incorporated in its entirety by reference for all purposes.

FIELD OF THE DISCLOSURE

This disclosure relates generally to software defined data centers and, more particularly, to methods, systems and apparatus to perform a workflow in a software defined data center.

BACKGROUND

In software defined data centers (SDDCs) networking, storage, processing, and security are virtualized and delivered as a service (sometimes referred to as "Infrastructure as a Service"). In such instances, the deployment, provisioning, configuration and operation of the entire network infrastructure is abstracted from hardware and implemented using software. SDDCs are often used by businesses to create a private cloud which is used to meet the data processing, network, and storage needs of the business/organization that operates the private cloud. SDDCs are also used to implement portions of the public cloud and in some instances can be used to create a hybrid cloud that includes a private cloud that accesses or uses portions of the public cloud. A primary advantage of an SDDC is the ability to use commodity hardware and software instead of having to rely on special purpose hardware/software that can be costly to maintain, upgrades, and expand. Companies that offer Infrastructure as a Service (also referred to as "cloud providers") design and manufacture the commoditized hardware/software as processing units installed in standardized frames, known as racks. The racks provide efficient use of floor space by allowing the processing units to be stacked vertically. The racks may additionally include other components of a cloud computing environment such as storage devices, networking devices (e.g., switches), etc.

Figure 1:
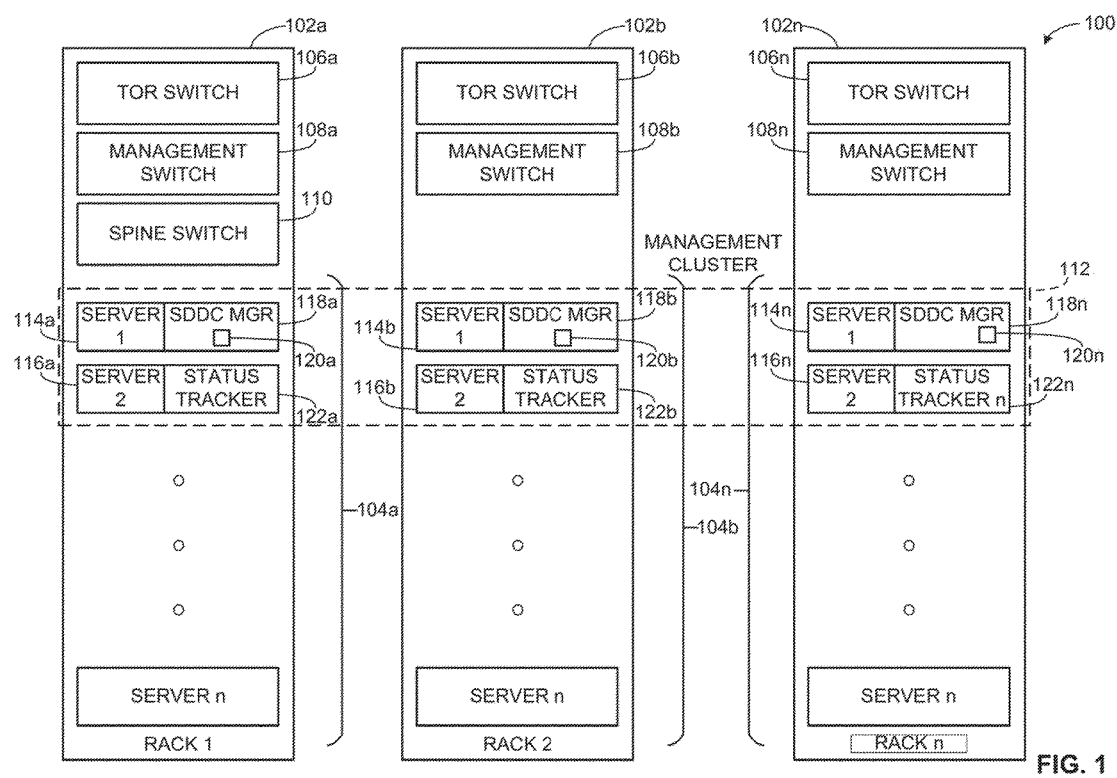
FIG. 1 is a block diagram illustrating an example software defined data center "SDDC" having an example management cluster that includes multiple instances of an example SDDC manager and having multiple instances of an example status tracker.

Wherever possible, the same reference numbers will be used throughout the drawing(s) and accompanying written description to refer to the same or like parts. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

DETAILED DESCRIPTION

Methods, systems and apparatus to perform a workflow in a software defined data center are disclosed herein. Example software defined data centers disclosed herein include a first workflow engine associated with a first processor. The first workflow engine executes a workflow and generates status information identifying the status of tasks included in the workflow. The software defined data center further includes a status tracker associated with a second processor. The status tracker collects and stores status information. A second workflow engine of the software defined data center is associated with a third processor. The second workflow engine begins executing the workflow in response to a signal indicating the first processor is no longer operable and executes the workflow based on the status information collected and stored by the status tracker. In some examples, the workflow is a first workflow of a plurality of workflows and the software defined data center further includes a workflow engine selector. The workflow engine selector assigns workflows included in the plurality of workflows to one of the first workflow engine or the second workflow engine based on respective affinity scores associated with the first and second workflow engines. An example first affinity score assigned to the first workflow engine relative to the first workflow is based on a proximity of the first workflow engine to a set of physical resources used to implement a workload domain associated with the first workflow. In some examples, the status tracker is a first status tracker and the software defined data center further includes a second status tracker associated with a fourth processor. The first and second status trackers collect and store status information generated by the first workflow engine and the second workflow engine. In further examples, the first workflow engine includes a task executor which, upon failure of one of the tasks of the workflow, is configured to automatically attempt re-execution of the first task until at least one of 1) the task is performed successfully, or 2) a threshold number re-executions have been attempted. In yet further examples, the first workflow engine includes a step tracker to track of number of successfully executed steps associated with a first task. The status tracker collects the number of successfully executed steps from the step tracker and stores the number of successfully executed steps. When the status information indicates the first workflow engine completed at least some but not all steps of the first task, the second workflow engine (when performing the workflow) obtains the number of successfully executed steps from the status tracker and skips a number of steps in the first task equal to the number of successfully executed steps. In still further examples, the first workflow engine is to determine whether a first task in the workflow is to be performed by the second workflow engine, and based on the determining that the first task is to be performed by the second workflow engine, the first workflow engine causes the first task to be performed by the second workflow engine. In some examples, the software defined data center also includes a plurality of physical racks. In some such examples, the first and second processors are installed in a first rack of the plurality of physical racks, and the workflow is associated with implementing a workload domain within the software defined data center. Some such example software defined data centers additionally include a fourth processor installed in a third rack of the software defined data center, the fourth processor to determine that a set of physical resources of the software defined data center is to implement the workload domain, and that the set of physical resources is installed on the first rack and, based on the determining that the set of physical resources to implement the workload domain is installed in the first rack, the fourth processor assigns the workflow to first workflow engine for execution.

Example methods to perform a workflow in a software defined data center disclosed herein include performing, by executing an instruction at a first processor of the software defined data center, one or more of a set of tasks of the workflow and causing, by executing an instruction with a second processor, status information generated by the first processor to be stored in a storage associated with the second processor. In some examples, the status information identifies the status of the one or more tasks of the workflow. Example methods further include, in response to determining that the first processor failed before performing all of the set of tasks of the workflow, causing a third processor to begin executing the set of tasks based on the status information provided by the second processor. In some example methods, the storage is a first storage and the methods further include causing the status information to be stored in a second storage associated with a fourth processor.

In some examples, the first processor is determined to have failed while performing a first task of the one or more tasks. Some such example methods further include determining a number of steps executed while performing the first task of the one or more tasks, and in response to determining that the first processor failed while performing the first task, using the number of steps executed to identify a next step of the first task to be executed by the third processor. In some examples, when the status information indicates a first task of one or more tasks performed by the first processor did not successfully execute, the first processor automatically attempts re-execution of the first task until at least one of 1) the task is performed successfully, or 2) a threshold number re-executions have been attempted. Further examples include determining, by executing an instruction at the first processor, that a first task in the one or more tasks is to be performed on a fourth processor installed in a third server rack of the software defined data center, and based on the determining that the first task is to be performed on the third processor, causing the first task to be performed at the fourth processor. In some example methods, the workflow is associated with implementing a workload domain within the software defined data center and the methods additional include determining, by executing an instruction with a fourth processor that a set of physical resources to implement the workload domain is installed on a first server rack of the software defined data center. Based on the determining that the set of physical resources to implement the workload domain is installed in the first server rack, the workflow is assigned to be performed on the first processor. In some examples, the set of physical resources is a first set of physical resources, and the method also includes determining, by executing an instruction with the fourth processor, that a second set of physical resources to implement the workload domain is installed in a fourth server rack of the software defined data center. Some such methods also include comparing a first amount of the first set of physical resources to a second amount of the second set of physical resources. In some such examples, assigning of the set of tasks to the first processor is based on a determination that the first amount of the first set of physical resources is greater than the second amount of the second set of physical resources. Further example methods include assigning a first affinity score to the first workflow engine and a second affinity score to the second workflow engine. Based on a comparison of the first affinity score and the second affinity score, the first workflow engine is selected to begin executing the workflow. In some examples, the first affinity score and the second affinity score are based on a proximity of the first workflow and the second workflow, respectively, to a set of physical resources used to implement a workload associated with the workflow.

Example instructions stored on tangible machine readable medium are further disclosed herein. The example instructions cause a first machine of a software defined data center to collect status information generated by a first workflow engine executing a first workflow, and to determine if the first workflow engine becomes inoperable while performing the first workflow. The instructions also cause the first machine to, in response to determining the first workflow engine has become inoperable, supply the status information to a second workflow engine for use in performing unexecuted portions of the workflow. In some examples, the status information is first status information and the workflow engine is a first workflow engine. In some such examples, the instructions further cause the first machine to synchronize the first status information with second status information collected from a second machine. The second status information is generated by a second workflow engine performing a second workflow. In some examples, the second workflow engine uses the status information to identify the unexecuted portions of the workflow.

Pre-packaged racks are available to businesses that want to install/deploy a private cloud. The pre-packaged racks can include a variety of pre-installed software files. One such set of pre-installed software files execute to operate as a software defined data center (SDDC) manager. The SDDC manager is adapted to deploy and configure a management cluster to manage the operation of the virtualized environment. In some examples, the management cluster performs non-production related operations for the virtual environment such as user-authentication, network security, network management, etc. Further, the management cluster may include a dedicated group of hosts reserved for running virtual machines that provide management services to infrastructure environments. In some examples, the services can include directory services, domain name services, and dynamic host configuration protocol services, and services such as those performed by VMware products VMware vCenter Server™, VMware vRealize® Operations™, and VMware Site Recovery Manager™. In some examples, the management cluster is separated from other clusters to help guarantee sufficient compute resources are always available to these critical infrastructure services for improved reliability and performance. If a site failure and subsequent recovery occurs, it is typically easier and faster to bring the foundational infrastructure services back online since they are located in a smaller, dedicated cluster. In addition to dedicating compute resources, separate storage is provided to the management cluster for the same reasons that dedicated compute resources are provided. In addition to performance and reliability, having storage dedicated to management resources makes it easier to architect proper data protection and disaster recovery for the workloads in the management cluster.

In addition, the SDDC manager may be adapted to deploy and configure one or more workload domains within the virtualized environment. A workload domain is a set of logical resources that are pooled to form a virtual infrastructure to support a client's production needs. Specifications of the workload domain, which may identify a compute capacity, a bandwidth capacity, a storage capacity, etc., are supplied by a user via a user interface to the SDDC manager. The SDDC manager performs automated operations to provision, deploy and configure the workload domain based on the user-supplied specifications. However, the sheer number of operations to be completed and the fact that the resources supporting both the management cluster and the workload domain(s) are often distributed across multiple racks causes the automated provisioning, deployment and configuration of the management cluster and the workload domain(s) to be both complex, error prone, and lengthy in duration. Thus, there is a need for methods, systems, apparatus, etc., that provide improved automatic provisioning, deployment and configuration of the management cluster and workload domains on pre-packaged virtualization systems/racks.

Example methods, apparatus, systems and articles of manufacture described herein ease the difficult of performing automatic provisioning, deployment, and configuration processes for virtualization racks by implementing a software defined data center (SDDC) manager having a distributed workflow engine that includes an instantiation of a workflow engine installed on each rack. The instance of the workflow engine installed on each rack is designated to perform workflow tasks associated with the provisioning, deployment and configuration processes that are targeted for that rack. In some examples, a workflow engine installed on a target rack is selected from a set of workflow engines each installed on different racks to perform the workflow operations based on a degree of affinity of the rack to, for example, the workload with which the workflow operations are associated. In some examples, a set of servers selected to be included in a workload domain are disposed in several racks. To identify which of the workflow servers will be assigned to perform the workflow process for the workload domain, the rack having the greatest number of assigned servers for the workload domain is identified and the workflow engine installed on the identified rack is assigned to do the workflow. In addition, a workflow status that identifies the status of each of the tasks/activities included in the workflow is maintained in on a different server than the server performing the workflow. Thus, if the server performing the workflow fails (or if the workflow fails for any reason), a workflow engine installed on another rack is selected to continue the workflow based on the workflow status. In some examples, if none of the other workflow engines have a greater affinity score than the other workflow engines, a least loaded of the workflow engines is selected to finish the workflow on behalf of the failed workflow engine. Otherwise, a workflow engine having the highest affinity score is assigned to finish the workflow on behalf of the failed workflow engine. To reduce the amount of remote procedure invocations and, thus, the amount of time that would otherwise be needed to communicate across racks, the files used to install the virtual machines (e.g., open virtualization format files having a ".ovf" extension) and that are used by the SDDC manager to provision, deploy and configure a workload domain are stored locally on each rack. Further, any workflow steps that must be performed on a rack other than the target rack are routed to the workflow engine on which the workflow steps are to be performed. For example, connectivity to some rack devices including top of the rack ("ToR") switches and spine switches is only available to locally (on same rack) disposed software/devices (i.e., to software/devices residing on the same physical rack). Accordingly, the workflow tasks to configure such switches are performed on the workflow engine installed on the rack having the switches.

FIG. 1 is a block diagram of an example software defined data center "SDDC" 100 having a set of "n" example physical server racks (Rack 1 102a, Rack 2 102b, . . . , Rack n 102n). Each of Rack 1 102a, Rack 2 102b, and Rack n 102n, includes a respective set of "n" example servers 104a, 104b, . . . , 104n, a respective example top-of-rack ("ToR") switch 106a, 106b, . . . , 106n, and a respective example management switch 108a, 108b, . . . , 108n. (It should be understood that although, for convenience, the total number of physical server racks and the total number of physical servers within the racks is denoted using "n," the total number of physical server racks and the total number of physical servers need not be equal.) In some examples, one or more of the physical server racks (e.g., Rack 1 102a) includes a spine switch 110. A management cluster 112 is implemented using a first server 114a and a second server 116a of the servers 104a in Rack 1 102a, a first server 114b, and a second server 116b of the servers 104b in Rack 2 102b, and a first server 114n and a second server 116n of the servers 104n in Rack n 102n.

In some examples, an instance of an example software defined data center "SDDC" manager 118a, 118b, 118n is installed on each of the first servers 114a, 114b, 114n. The SDDC managers 118a, 118b, 118n operate together to form a distributed SDDC manager. The SDDC managers 118a, 118b, 118n each include a workflow engine 120a, 120b, 120n that is responsible for executing a set of workflows. In some examples, a corresponding example status tracker 122a, 122b, 122n is installed on each of the second servers 116a, 116b, 116n in each of Rack 1 102a, Rack 2 102b and Rack n 102n. In some examples, the SDDC manager 118a, 118b, 118n on each of Rack 1 102a, Rack 2 102b, Rack n 102n causes the corresponding status tracker 122a, 122b, 122n to be instantiated on the corresponding second server 116a, 116b, 116n. In some examples, the distributed SDDC manager (118a, 118b, 118n) is configured to provision and configure the virtual resources of the SDDC 100 by performing a set of workflows. Each workflow includes a set of predefined tasks to be executed by one of the workflow engines to achieve a desired provisioning, deployment and/or configuration process. Although in FIG. 1, two of the servers on each rack are shown as being included in the management cluster, this is a configurable number and can, therefore include any number of servers (e.g., three servers, four servers, etc.). Further, although in FIG. 1, a status tracker is shown as being installed on each of the racks, in some examples, a status tracker need not be installed on every rack and could be installed in any number of the racks including, for example, three racks.

Figure 2:
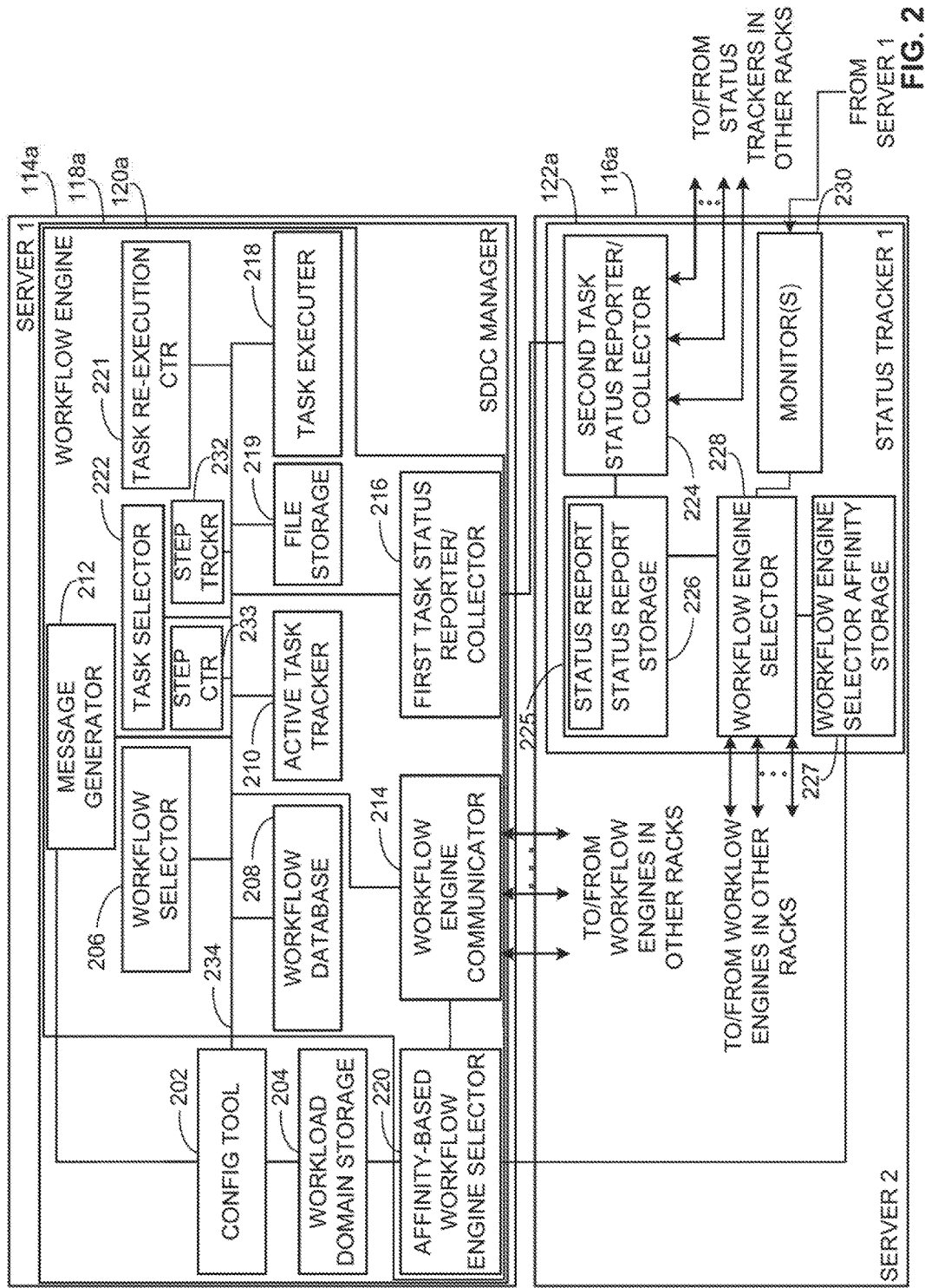
FIG. 2 is a block diagram of an example implementation of an instance of the example SDDC manager and an instance of the example status tracker.

FIG. 2 includes a block diagram of the example first server 114a and a block diagram of the example second server 116a, both installed in the Rack 1 102A. The example SDDC manager installed in the first server 114a includes an example configuration tool 202, coupled to an example workload domain storage 204, and coupled to the example workflow engine 120a. The workflow engine 120a includes an example workflow selector 206, an example workflow database 207, an example workflow database storage 208, an example active task tracker 210, an example message generator 212, an example workflow engine communicator 214, an example first status reporter/collector 216, an example task executor 218, an example virtualization file storage 219, an example affinity-based workflow engine selector 220, an example task re-execution counter 221, an example task selector 222, an example step tracker 232 and an example step counter storage 233, all of which are communicatively coupled via an example communication bus 234. The example status tracker 122a installed in the second server 116a of Rack 1 102a includes an example second task status reporter/collector 224, an example task status report 225, an example task status report storage 226, an example workflow engine selector affinity score storage 227, an example workflow engine selector 228, and an example monitor 230. It is to be understood that the SDDC managers installed in the second server 114b and the n$^{th}$ server 114n can include the same circuits, devices, blocks, etc. as the SDDC manager illustrated in FIG. 2. Likewise, the example status trackers 122b, 122n can include the same circuits, devices, blocks, etc., as the status track 122a illustrated in FIG. 2. In some examples, the status trackers 122a, 122b, . . . , 122n can be implemented using Apache Zookeeper.

In some examples, the example configuration tool 202 identifies a workflow(s) to be performed by the example workflow engine 120a based on one of a set of provisioning, deployment and/or configuration processes to be performed. In some examples, the configuration tool 202 identifies the workflow (or set of workflows) based on input supplied by a network administrator identifying a workload domain to be configured and/or in response to the addition of hardware resources (e.g., another physical rack is installed in the SDDC 100). The name of the workflow is supplied by the configuration tool 202 to the example workflow selector 206 via the example communication bus 234. In response, the workflow selector 206 uses the workflow name to access the example workflow database storage 208 and identify a set of tasks included in the workflow as well as information concerning the execution of the tasks. In some examples, the information concerning the execution of the tasks includes information identifying a sequential order in which two or more of the tasks are to be executed and/or information identifying tasks that can be executed in parallel. In addition, the workflow selector 206 causes the tasks and information concerning the execution of the tasks to be stored in the active task tracker 210. In some examples, an initial status of "not yet started" is assigned to each task upon storage in the active task tracker 210. In response to the storage of tasks in the active task tracker 210, the example task selector 222 accesses the active task tracker 210 to select a first of the tasks to be executed (or multiple tasks in the list of tasks, provided that parallel execution of such multiple tasks is permitted). The task selector 222 supplies the task to the example task executor 218 which causes the task to be executed. When performing, for example, a task related to deploying virtual machines and/or virtual machine management tools, the task executor can access an appropriate one of a set of virtualization files (e.g., files having a ".ovf" extension) stored in the example virtualization file storage 219. In some examples, the task executor 218 may, upon successful (or unsuccessful) completion of the task, supply information identifying the task status (e.g., successful, unsuccessful, partially successful, etc.) and a number corresponding to the task in the workflow to the example first task status reporter/collector 216 which supplies the status information to the example second task status reporter/collector 224 of the status tracker 122a. The second task status reporter/collector 224 uses the task information and task status information supplied by the workflow engine 120a to update an example task status report 225 residing in the task status report storage 226. In this manner the status of the tasks executed by the workflow engine 120a of the first server 114a is stored on the second server 116a such that, if the first server 114a were to fail, another of the workflow engines (e.g., the workflow engine 120b, the workflow engine 120n) residing on another of the racks (e.g., the Rack 2 102b, the Rack n 102n) could instead be instructed to continue executing the workflow from the last, successfully executed task.

Provided that execution of the first task is successful, the example task executor 218 informs the example task selector 222 of the success. The example task selector 222 responds by selecting a next task from the example active task tracker 210 to be executed and supplying the next task to the task executor 218. In some examples, if the task executor 218 is unable to successfully complete the first task, the task executor 218 (in addition to reporting the failed status to the example first task status collector/reporter 216) also attempts to re-execute the task. In some examples, the task executor 218 is configured to attempt task re-execution a threshold number of times as tracked in the example task re-execution counter 221 until either execution of the first task is successful or until the threshold number of attempted executions have failed. If the threshold number of attempted executions have all failed, the task executor 218 halts execution of the workflow and provides a notice to the example message generator 212.

The message generator 212 generates a message to be displayed on a graphical user interface (see FIG. 8) accessible via the example configuration tool 202. The message can indicate that the threshold number of attempted executions have failed and further provide the user (e.g., a system administrator) with an option to re-attempt execution of the task manually. Thus, the system administrator is provided with an opportunity to take any corrective action that may be needed before manually attempting to re-execute the failed task. In some examples, the message displayed on the graphical user interface (see FIG. 8) identifies the workflow that is currently stalled, the task of the workflow that has been attempted but failed a threshold number of times and may further identify potential causes of the failure. In some examples, the potential causes of the failure can be stored in the example workflow database 207 stored in the example workflow database storage 208. The workflow database 207 includes information about the workflow such as, for example, a list of tasks included in the workflow, a list of systems affected by execution of tasks included in the workflow, dependencies between tasks included in the workflow, etc. In some examples, the message generated by the message generator 212 further identifies a method by which the system administrator may launch the manual attempt to re-execute the task (e.g., selecting a key on a keypad, a touchscreen, etc).

In some examples, the example monitor 230 continuously monitors the operational status of the example first server 114a on which the example SDDC manager 118a is operating. In some examples, the monitor 230 determines the operational status of the first server 114a using a heartbeat signal generated by the first server 114a. Provided that a heartbeat continues to be received, the first server 114a is deemed operational and no action is required. If the monitor 230 determines that the heartbeat of the first server 114a is no longer being received while a workflow is being (or waiting to be executed) the monitor 230 notifies the example workflow engine selector 228. The workflow engine selector 228 responds by identifying another of the workflow engines (e.g., the workflow engine 120b, the workflow engine 120n, etc.) to begin executing the workflow. The workflow engine selector 228 may use any of a number of methods/algorithms to select another workflow engine to perform the workflow, including, for example, a random selection algorithm, a selection algorithm based on an amount of load on the workflow engines, a selection algorithm based on an affinity score assigned to the workflow engines, etc. After selecting the workflow engine to be assigned to complete the workflow, the workflow engine selector 228 transmits a signal to the selected workflow engine. The signal may include an instruction to begin executing a workflow, a workflow identifier (name) identifying the workflow to be executed, status information identifying a last, successfully completed task of the workflow, etc. The workflow engine selector 228 in receipt of the signal responds by performing the workflow at a point beginning at the task following a last, successfully completed task.

As described briefly above, the example second task status reporter/collector 224 of the status tracker 122a provides updates to the status trackers 122b, 122n installed on the Rack 2 102b and the Rack n 102n, respectively. The status tracker 122a also receives updates from the status trackers 122b, 122n. As a result, the status trackers 122a, 122b, 122n each store the status of all tasks in all workflows being performed by the workflow engines 120a, 120b, 120c. In some examples, the status trackers 122a, 122b, 122n also track information identifying the workflow engine responsible for executing each workflow. Thus, in the example described above, in which the first server 114a performing a first workflow on Rack 1 102a becomes inoperable, the workflow engine selector 228 need only select one of the workflow engines 122b, 122n to complete the workflow and then instruct the selected workflow engine to begin executing the workflow. The selected workflow engine can then consult the status tracker 122b installed on the Rack 2 102b to identify the last successfully completed task and begin executing the next task in the workflow. Or, because the status trackers 122a, 122b, . . . , 122n contain synchronized information, the selected workflow engine can consult any of the status trackers to identify the last successfully completed task and begin executing the next task in the window.

Referring still to FIG. 2, in some examples, the example workflow engine 120a includes an affinity-based workflow engine selector 220. In some such examples, the workflow engine 120 in which the affinity-based workflow engine selector 220 is implemented operates as a master workflow engine. The master workflow engine may be implemented using any of the workflow engines 120a, 120b, 120n installed on any of the first servers 114a, 114b, 114n. The master workflow engine 120a receives, from the example configuration tool 202, information concerning a workload domain to be configured. As described above, a workload domain is a set of logical resources that are pooled to form a virtual infrastructure to support a client's production needs. Specifications of the workload domain, which may identify a compute capacity, a bandwidth capacity, a storage capacity, etc., are supplied by a system administrator via a user interface to a configuration tool 202. The configuration tool 202 uses the specifications to carve out the set of resources that will be used to implement/support the workload domain. In some examples, the configuration tool 202 identifies a set of virtual machines that will be used to implement the workload domain. In addition, the configuration tool 202 identifies the physical servers on which the virtual machines are to be implemented and further identifies the physical racks on which the physical servers reside. The identified workload information is stored in a workload domain storage 204 coupled to the configuration tool 202. The configuration tool notifies the affinity-based workflow engine selector 220 of the master workflow engine 120a of the need to perform the workflows associated with provisioning, deploying and configuring of the physical and virtual resources that have been carved out for the workload domain.

The example affinity-based workflow engine selector 220 responds to the notification from the example configuration tool 202 by accessing the workload domain storage 204 to obtain the workload domain information stored by the configuration tool 202. The affinity-based workflow engine selector 220 uses the stored information to determine which of the workflow engines 120a, 120b, 120n will be assigned to perform the workflows associated with provisioning, deploying and configuring the workload domain. In some examples, the affinity-based workflow engine selector 220 identifies the physical servers that correspond to the virtual machines selected to implement the workload domain and the physical racks in which the servers are installed based on the workload domain information. In addition, the affinity-based workflow engine selector 220 determines which of the physical racks in the workload domain information includes the greatest number of physical resources used to support the workload domain. The affinity-based workflow engine selector 220 assigns the highest affinity score to the workflow engine residing on the physical rack having the highest affinity score. In addition, the affinity-based workflow engine selector 220 determines which of the remaining physical racks included in the workload domain information includes the second greatest number of physical resources used to support the workload domain and assigns a second highest affinity score to the workflow engine residing on the physical rack having the second highest affinity score. The affinity-based workflow engine 220 assigns the remaining physical racks affinity scores in a similar fashion (e.g., affinity scores are assigned to workflow engines installed on physical racks based on the number of physical resources installed on the same physical rack that will be used to support the workload domain). In some examples, the workflow engines installed on racks having no physical resources assigned to the workload domain will be assigned the lowest affinity score. In some such examples, two or more workflow engines having a same or very similar affinity scores may be assigned a workflow based on an amount of load carried by the two or more workflow engines (e.g., as between two or more workflow engines having a same affinity score based on number of physical resources, the workflow engine having a lighter load than the other workflow engines may be assigned a higher affinity score than the other workflow engines). After assigning affinity scores to the workflow engines for execution of the tasks needed to configure a given workload domain, the affinity-based workflow engine selector 220 notifies the workflow selector 206 associated with the workflow engine having the highest affinity score, by supplying the names of the workflows associated with implementing the workload domain to the workflow selector 206. In some such examples, the workflows associated with implementing a workload domain can be stored in the workflow domain storage 204. In addition, the affinity-based workflow engine selector 220 supplies the affinity scores that have been assigned to the other workflow engines for purposes of implementing the workload domain to the workflow engine selector 228 of the status tracker 122a. The status tracker 122a causes the affinity scores and corresponding workflow engine identifiers to be stored in the example workflow engine selector affinity score storage 227 for use in selecting a different workflow engine to be assigned to complete the workflows associated with implementing the workload in the event that the server on which the workload engine currently executing the workflows becomes inoperable. Thus, the workflows to implement a workload are assigned to a workflow engine having a greatest affinity score based on the number of resources residing on the same rack as the workflow engine. As a result, the workflows needed to implement the workload are performed, wherever possible, on the same physical rack that will support the workload domain thereby reducing the number of time consuming remote procedure invocations that would otherwise be required to implement the workload domain. Tasks related to workload domain implementation as well as instantiation of virtual machine management tools can be performed on each rack locally, in part, because each of the workflow engines 120a, 120b, 120n on each of Rack 1 102a, Rack 2 102b, Rack n 102n, respectively, includes a (local) virtualization file storage 219 in which the files needed to install virtual machines, virtual storage, virtual network and virtual management tools are stored.

In some examples, the example workflow engine 120a can re-assign a workflow task(s) to one of the workflow engines 120b, 120n installed on Rack 2 102b, and Rack n 102n, respectively. In some such examples, when the example task executor 218 of the workflow engine 102a selects a task to be executed from a set of workflow tasks, the task executor 218 determines whether the selected task is to configure a physical rack device (e.g., a ToR switch, a spine switch, etc.) residing on a rack other than Rack 102a (e.g., Rack 2 102b, Rack n 102, etc.). If so, instead of executing the task, the task executor causes 218 causes the task to be transmitted to the example workflow engine communicator 214 for transmission to the workflow engine residing in a server on the same physical rack as the physical rack device. The workflow engine in receipt of the workflow task, responds to the information by performing the workflow task (or set of tasks).

In some examples, the workflow tasks include a set of subtasks (referred to herein as "steps") to be executed before the status of the workflow task is considered "successfully completed." In some such examples, an example step tracker 232 of the workflow engine 120a is coupled to the task executor 218 and monitors the tasks performed by the task executor 218. When a task having multiple steps is executed, the step tracker 232 causes a value stored in the example step counter storage 233 (which is initialized to contain a zero before each task is performed) to be incremented by one each time one of the steps is successfully performed and causes the value stored in the step counter to be supplied to the example first task status reporter/collector 216 for delivery to the example second task status reporter/collector 224 of the example status tracker 122a. The second task status reporter/collector 224 causes the value of the step counter to be included in the status report 225 stored in the status report storage 226. If, while a task having steps is being executed, the workflow is interrupted due to, for example, failure of the first server 114a, the value stored in the step counter and included in the status report 225 is used by the workflow engine (e.g., workflow engine 120b) that takes over execution of the workflow and is used to identify which of the steps were completed and which have not yet been completed so that the workflow engine 120b can begin performing the workflow at the appropriate one of the steps of the workflow task that was pending completion at the time of the failure. As a result, there is no need for (and indeed no risk that) the workflow engine 120b tries to perform steps that have already been successfully performed. The ability to track steps of a task in this manner prevents the risk of workflow corruption that might otherwise occur if a successful task were to be mistakenly executed again. In addition, the ability to track steps of a task in this manner provides the workflow engine 120b to determine which of the steps may need to be rolled back in the event that the workflow has failed and the steps must be rolled back before (and re-performed) before the workflow engine can continue successfully executing the workflow.

While example manners of implementing the example system of FIG. 1 have been illustrated in FIG. 2 one or more of the elements, processes and/or devices illustrated in FIG. 1 and FIG. 2 can be combined, divided, re-arranged, omitted, eliminated and/or implemented in any other way. Further, any of the example management cluster 112, the example first set of servers 104a, the example second set of servers 104b, the example nth set of servers 104n, the example first servers 114a, 114b, 114n, the example second servers 116a, 116b, 116n, the example SDDC managers 118a, 118b, 118n, the example workflow engines 120a, 120b, 120n, the example status trackers 122a, 122b, 122n, the example configuration tool 202, the example workload domain storage 204, the example workflow selector 206, the example workflow database 207, the example workflow database storage 208, the example active task tracker 210, the example message generator 212, the example workflow engine communicator 214, the example first task status reporter/collector 216, the example task executor 218, the example virtual file storage 219, the example affinity-based workflow engine selector 220, the example task re-execution counter 221 the example task selector 222, the example second task status reporter/collector 224, the example status report 225, the example status report storage 226, the example workflow engine selector affinity score storage 227, the example workflow engine selector 228, the example monitors 230, the example step tracker 232, the example step counter storage 233, the example communication bus 234 and/or, more generally, the software defined data center 100 may be implemented by hardware, software, firmware and/or any combination of hardware, software and/or firmware. Thus, for example, any of the example management cluster 112, the example first set of servers 104a, the example second set of servers 104b, the example nth set of servers 104n, the example first servers 114a, 114b, 114n, the example second servers 116a, 116b, 116n, the example SDDC managers 118a, 118b, 118n, the example workflow engines 120a, 120b, 120n, the example status trackers 122a, 122b, 122n, the example configuration tool 202, the example workload domain storage 204, the example workflow selector 206, the example workflow database 207, the example workflow database storage 208, the example active task tracker 210, the example message generator 212, the example workflow engine communicator 214, the example first task status reporter/collector 216, the example task executor 218, the example virtual file storage 219, the example affinity-based workflow engine selector 220, the example task re-execution counter 221, the example task selector 222, the example second task status reporter/collector 224, the example status report 225, the example status report storage 226, the example workflow engine selector affinity score storage 227, the example workflow engine selector 228, the example monitors 230, the example step tracker 232, the example step counter storage 233, the example communication bus 234, and/or, more generally, the example SDDC 100 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus or system claims of this patent are read to cover a purely software and/or firmware implementation at least one of the example management cluster 112, the example first set of servers 104a, the example second set of servers 104b, the example nth set of servers 104n, the example first servers 114a, 114b, 114n, the example second servers 116a, 116b, 116n, the example SDDC managers 118a, 118b, 118n, the example workflow engines 120a, 120b, 120n, the example status trackers 122a, 122b, 122n, the example configuration tool 202, the example workload domain storage 204, the example workflow selector 206, the example workflow database 207, the example workflow database storage 208, the example active task tracker 210, the example message generator 212, the example workflow engine communicator 214, the example first task status reporter/collector 216, the example task executor 218, the example virtual file storage 219, the example affinity-based workflow engine selector 220, the example task re-execution counter 221, the example task selector 222, the example second task status reporter/collector 224, the example status report 225, the example status report storage 226, the example workflow engine selector affinity score storage 227, the example workflow engine selector 228, the example monitors 230, the example step tracker 232, the example step counter storage 233, and the example communication bus 234 are hereby expressly defined to include a tangible computer readable medium such as a memory, digital versatile disk (DVD), compact disk (CD), etc., storing such software and/or firmware. Further still, the example SDDC 100 of FIG. 1 may include one or more elements, processes and/or devices in addition to, or instead of, those illustrated in FIG. 1 and FIG. 2, and/or may include more than one of any or all of the illustrated elements, processes and devices.

Flowcharts representative of example machine readable instructions for implementing the example SDDC managers 118a, 118b, 118n and the example status trackers 122a, 122b, 122n of FIG. 1 and/or FIG. 2 are shown in FIGS. 3-7. In this example, the machine readable instructions comprise a program for execution by a processor such as the processor 912 shown in the example processor platform 900 discussed below in connection with FIG. 9 or a processor as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 912 and/or the processor 1012, but the entire program and/or parts thereof could alternatively be executed by a device other than the processor 912 and/or the processor 1012 and/or embodied in firmware or dedicated hardware. Further, although the example program is described with reference to the flowchart illustrated in FIGS. 3-7, many other methods of implementing the example software defined data center 100, the SDDC managers 118a, 118b, 118n and the status trackers 122a, 122b, 122n may alternatively be used. For example, the order of execution of the blocks may be changed, and/or some of the blocks described may be changed, eliminated, or combined.

As mentioned above, the example processes of FIGS. 3-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 3-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 3:
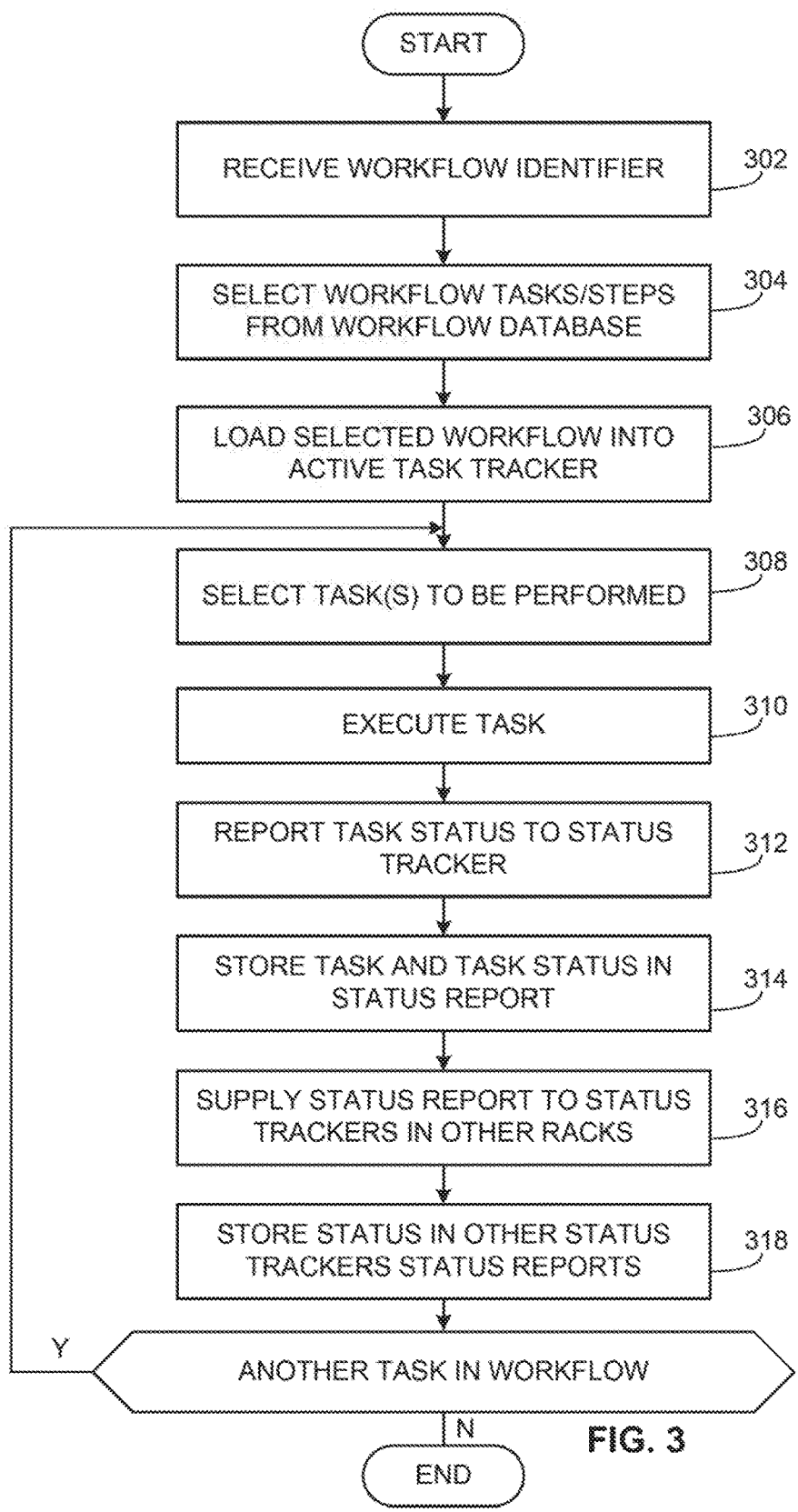
FIG. 3 is a flowchart representative of example computer readable instructions that can be executed to implement the example SDDC manager and example status tracker of FIG. 1.

Example machine readable instructions 300 that may be executed to implement the SDDC managers 118a, 118b, 118n of FIGS. 1 and 2 are illustrated by the flowchart shown in FIG. 3. The example machine readable instructions 300 may be executed periodically and/or aperiodically (e.g., at predetermined intervals, based on an occurrence of a predetermined event, etc., or any combination thereof). The machine readable instructions 300 begin execution at a block 302 of FIG. 3 at which the example workflow selector 206 receives a workflow identifier/name from the example configuration tool 202. At a block 304, the example workflow selector 206 uses the workflow identifier/name to identify a corresponding set of workflow tasks/steps, as well as information concerning the execution of the tasks, from the example workflow database 208. At a block 306, the workflow selector 206 causes the tasks and information concerning the execution of the tasks to be stored in the active task tracker 210. In some examples, the workflow selector additionally assigns an initial status of "not yet started" to each task upon storage in the active task tracker 210. At a block 308, the example task selector 222 accesses the active task tracker 210 to select a first of the tasks to be executed (or multiple tasks in the list of tasks, provided that parallel execution of such multiple tasks is permitted). The task selector 222 supplies the task(s) to the example task executor 218 which causes the task(s) to be executed at a block 310. When performing, for example, a task related to deploying virtual machines and/or virtual machine management tools, the task executor 218 can access an appropriate one of a set of virtualization files (e.g., files having a ".ovf" extension) stored in the example virtualization file storage 219. At a block 312, the task executor 218 supplies information identifying the task status (e.g., successful, unsuccessful, partially successful, etc.) to the example first task status reporter/collector 216 which transmits the information to the second task status reporter/collector 224 of the status tracker 122a. At a block 314, the task information and task status information supplied by the workflow engine 120a is used by the second task status reporter/collector to update the example task status report 225 residing in the example task status report storage 226. At a block 316, the example second status reporter/collector 224 distributes the updated status report to the status trackers residing in other racks and, at a block 318, the other status trackers cause the received, updated status report information to be into their respective status reports. At a block 320, the task selector determines whether another task is yet to be completed in the workflow. If so, the operations described with reference to blocks 308-318 are repeated until all of the tasks included in the workflow have been completed at which point the program returns to block 302 at which a next workflow is received and the steps 304-318 are repeated in the manner described above.

Figure 4:
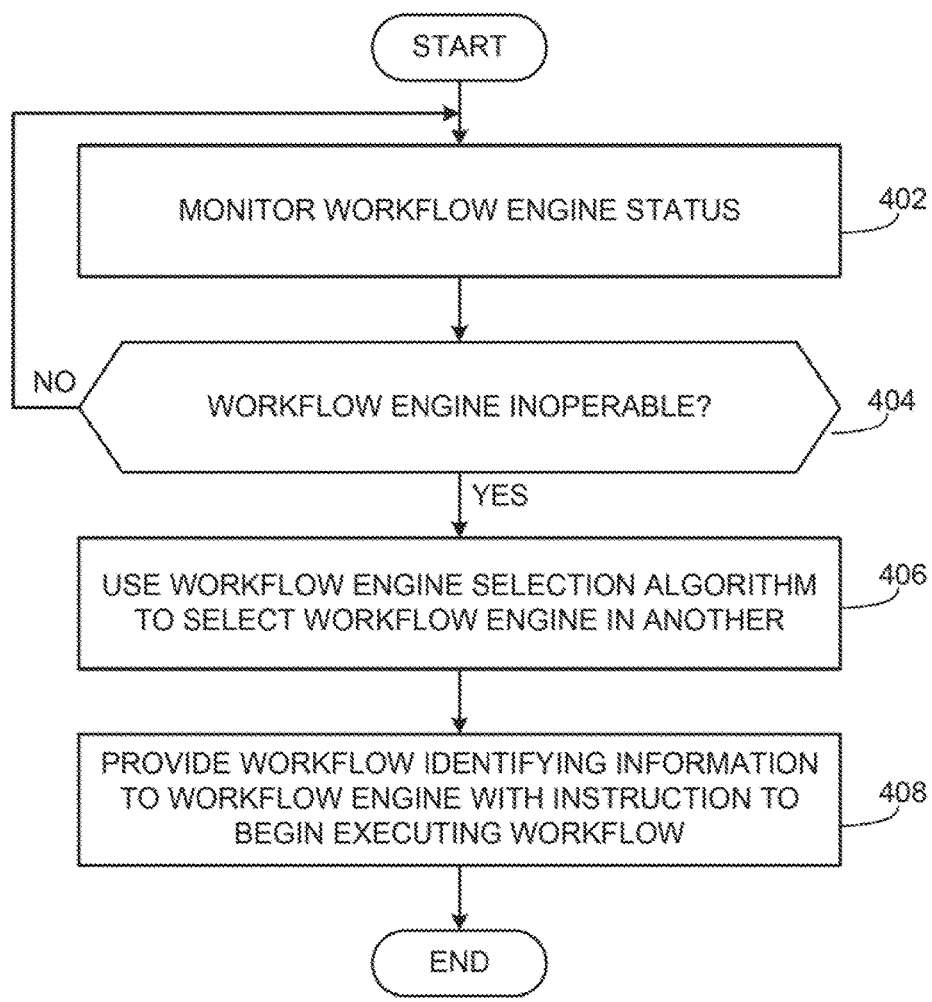
FIG. 4 is a flowchart representative of example computer readable instructions that can be executed to implement the example SDDC manager and example status tracker of FIG. 1.

Example machine readable instructions 400 that may be executed to implement the example SDDC managers 118a, 118b, 118n and the example status trackers 122a, 122b, 122n of FIGS. 1 and 2 are illustrated by the flowchart shown in FIG. 4. The example machine readable instructions 400 may be executed periodically and/or aperiodically (e.g., at predetermined intervals, based on an occurrence of a predetermined event, etc., or any combination thereof). The machine readable instructions 400 begin execution at a block 402 of FIG. 4 at which the example monitor 230 determines the operability of the corresponding workflow engine. In some examples, the monitor 230 is monitoring the health of the workflow engine based on a heartbeat generated by the workflow engine. At a block 404, the monitor 230 determines whether the workflow engine has become inoperable. If not, the program returns to the block 402 at which the monitor 230 continues to monitor the workflow engine status. If the workflow engine is determined to be inoperable (e.g., a heartbeat is no longer detected) at the block 404, the monitor 230 alerts the example workflow engine selector 228 which responds by identifying another of the workflow engines (e.g., the workflow engine 120b, the workflow engine 120n, etc.) to begin executing the workflow at a block 406. The workflow engine selector 228 may use any of a number of methods/algorithms to select another workflow engine to perform the workflow, including, for example, a random selection algorithm, a selection algorithm based on an amount of load on the workflow engines, a selection algorithm based on an affinity score assigned to the workflow engines, etc. After selecting the workflow engine to be assigned to complete the workflow, the workflow engine selector 228 transmits a signal to the selected workflow engine at a block 408. The signal may include an instruction to begin executing a workflow, a workflow identifier (name) identifying the workflow to be executed, status information identifying a last, successfully completed task of the workflow, etc. The workflow engine selector 228 in receipt of the signal responds by performing the workflow at a point beginning at the task following a last, successfully completed task. After providing the signal to the workflow engine information to the workflow engine assigned to execute the workflow, the program ends.

Figure 5:
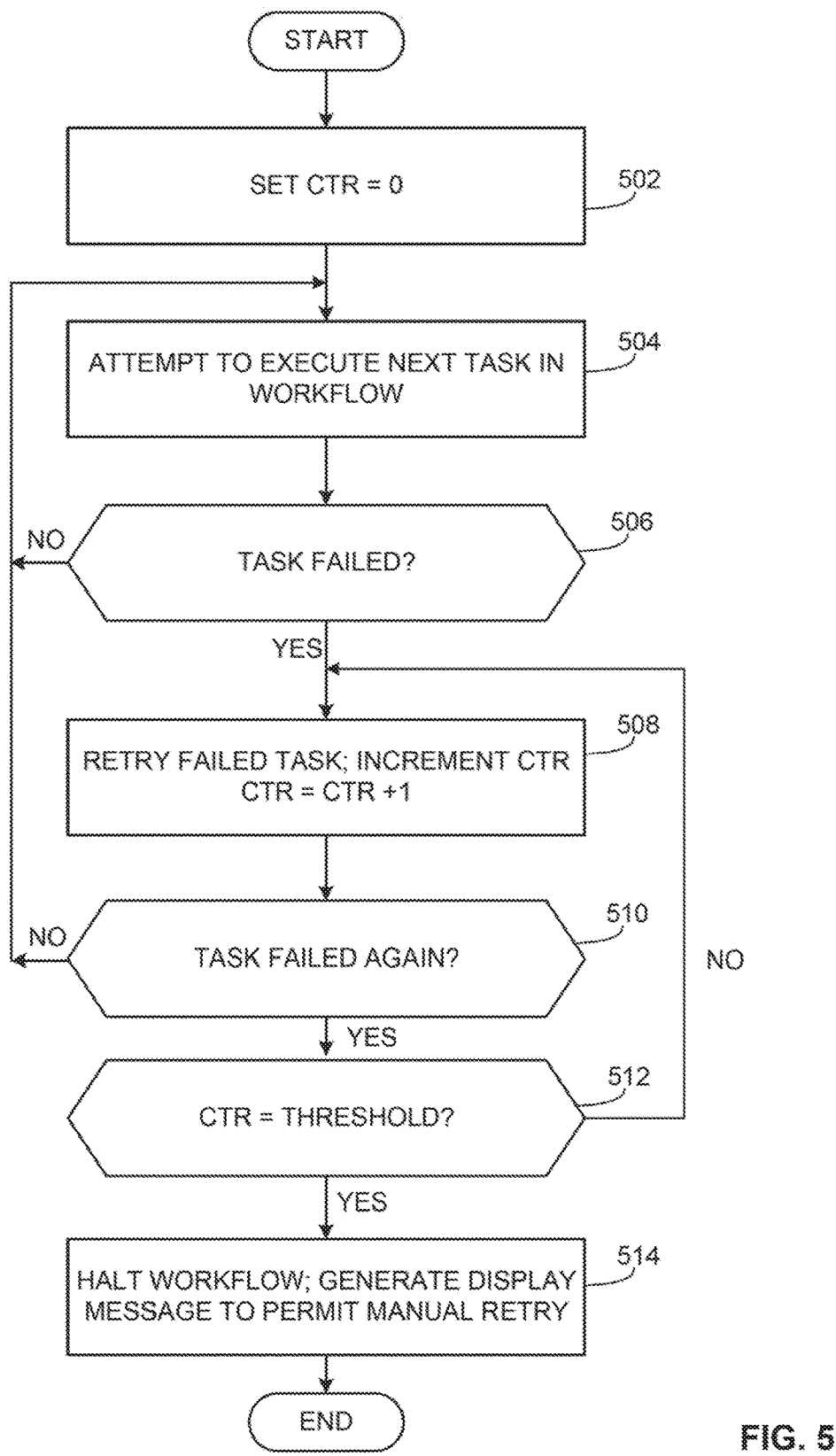
FIG. 5 is a flowchart representative of example computer readable instructions that can be executed to implement the example SDDC manager of FIG. 1.

Example machine readable instructions 500 that may be executed to implement the example SDDC managers 118a, 118b, 118n and the example status trackers 122a, 122b, 122n of FIGS. 1 and 2 are illustrated by the flowchart shown in FIG. 5. The example machine readable instructions 500 may be executed periodically and/or aperiodically (e.g., at predetermined intervals, based on an occurrence of a predetermined event, etc., or any combination thereof). The machine readable instructions 500 begin execution at a block 502 of FIG. 5 at which the example task re-execution counter 221 is set to zero. At a block 504, the task executor 218 attempts to execute a next task in a workflow. In some examples, if the task executor 218 successfully completes the task as determined at a block 506, the program returns to the block 504 and the task executor attempts to execute a next task in the workflow. If the task executor 218 is unable to successfully complete the first task as determined at the block 506, the task executor 218 (in addition to reporting the failed status to the example first task status collector/reporter 216) also attempts to re-execute (retry) the failed task and increments the task re-execution counter 221 to indicate that re-execution has been attempted. If the task execution again fails as determined at a block 510, the task executor 218 determines whether the task re-execution counter is equal to a threshold number of permitted attempted re-executions at a block 512. If the number of attempted re-executions is not equal to the threshold, the program returns to the block 508 where the counter is again incremented and the failed task is attempted once more. If it is determined at the block 512 that the number of attempted re-executions as tracked in the task re-execution counter 218 is equal to the threshold, then the re-execution is not attempted and, at a block 514, the example message generator generates a message indicating that the threshold number of attempted executions have failed and providing an option to re-attempt execution of the task manually at the program ends. Thus, the system administrator is provided with an opportunity to take any corrective action that may be needed before manually attempting to re-execute the failed task. In some examples, the message displayed on the graphical user interface identifies the workflow that is currently stalled, the task of the workflow that has been attempted but failed a threshold number of times and may further identify potential causes of the failure. In some examples, the potential causes of the failure can be stored in the example workflow database 207 stored in the example workflow database storage 208. The workflow database 207 includes information about the workflow such as, for example, a list of tasks included in the workflow, a list of systems affected by execution of tasks included in the workflow, dependencies between tasks included in the workflow, etc. In some examples, the message generated by the message generator 212 further identifies a method by which the system administrator may launch the manual attempt to re-execute the task (e.g., selecting a key on a keypad, a touchscreen, etc).

Figure 6:
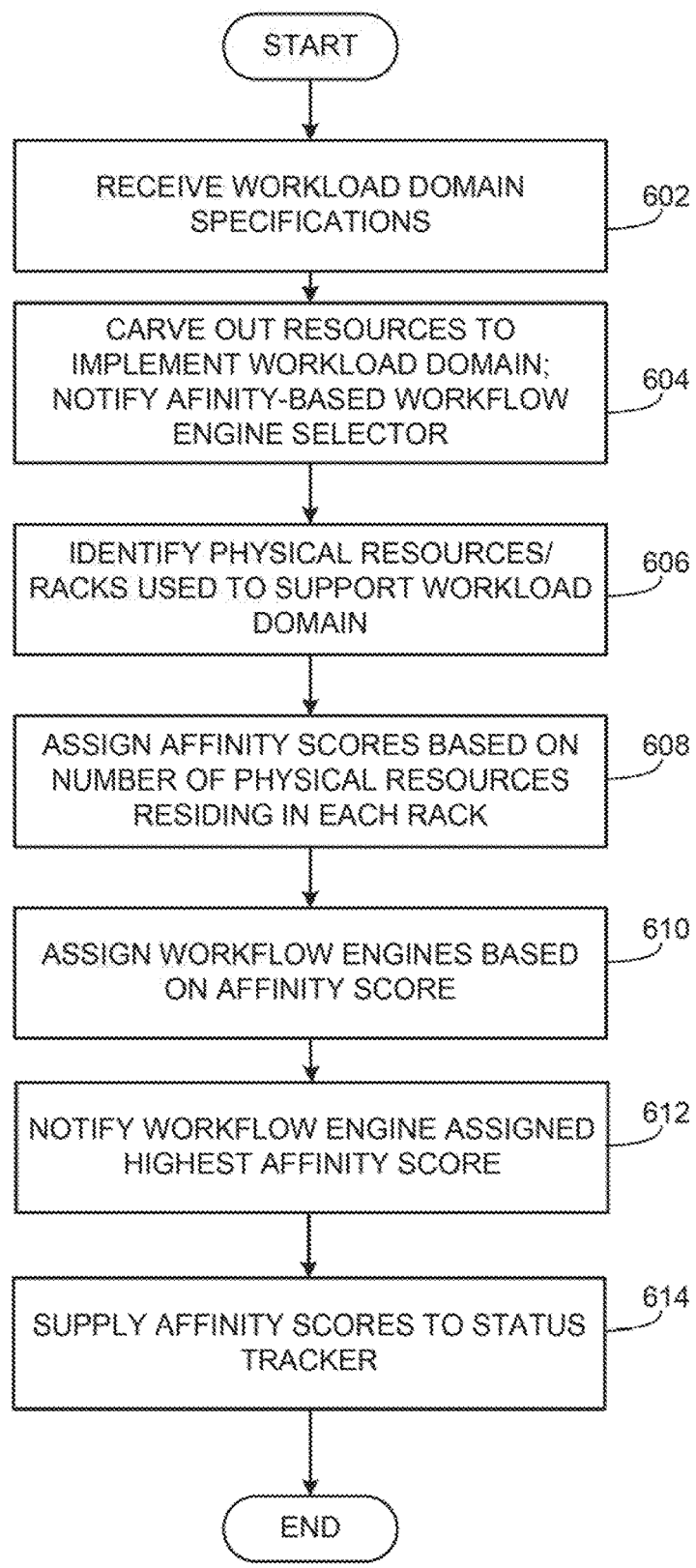
FIG. 6 is a flowchart representative of example computer readable instructions that can be executed to implement the example SDDC manager and the example status tracker of FIG. 1.

Example machine readable instructions 600 that may be executed to implement the example workflow engine 120a, 120b. 102c of FIGS. 1-2 and the example configuration tool of FIG. 2 are represented by the flowchart shown in FIG. 6. The example machine readable instructions 600 may be executed periodically and/or aperiodically (e.g., at predetermined intervals, based on an occurrence of a predetermined event, etc., or any combination thereof). The machine readable instructions 600 begin execution at block 602 of FIG. 6 at which the configuration tool 202 received a set of workload domain specifications identifying the capacity needed to support the workload domain. At a block 604, the configuration tool 202 uses the specifications to carve out the set of resources that will be used to implement/support the workload domain. In some examples, the configuration tool 202 identifies a set of virtual machines that will be used to implement the workload domain. In addition, the configuration tool 202 identifies the physical servers on which the virtual machines are to be implemented and further identifies the physical racks on which the physical servers reside. The identified workload information is stored in a workload domain storage 204 coupled to the configuration tool 202. Also, at the block 604, the configuration tool notifies the affinity-based workflow engine selector 220 of the master workflow engine 120a of the need to perform the workflows associated with provisioning, deploying and configuring of the physical and virtual resources that have been carved out for the workload domain. At a block 606, the example affinity-based workflow engine selector 220 responds to the notification from the example configuration tool 202 by accessing the workload domain storage 204 to obtain the workload domain information stored by the configuration tool 202 and using the stored information to identify the physical servers that correspond to the virtual machines selected to implement the workload domain and the physical racks in which the servers are installed based on the workload domain information. In addition, the affinity-based workflow engine selector 220 determines which of the physical racks in the workload domain information includes the greatest number of physical resources used to support the workload domain. At a block 608, the affinity-based workflow engine selector 220 assigns affinity scores to the workflow engines based on the physical resources residing in each rack. In some examples, the highest affinity score is assigned to the workflow engine residing on the physical rack having the highest affinity score. In addition, the affinity-based workflow engine selector 220 determines which of the remaining physical racks included in the workload domain information includes the second greatest number of physical resources used to support the workload domain and assigns a second highest affinity score to the workflow engine residing on the physical rack having the second highest affinity score. The affinity-based workflow engine 220 assigns the remaining physical racks affinity scores in a similar fashion (e.g., affinity scores are assigned to workflow engines installed on physical racks based on the number of physical resources installed on the same physical rack that will be used to support the workload domain). In some examples, the workflow engines installed on racks having no physical resources assigned to the workload domain will be assigned the lowest affinity score. In some such examples, two or more workflow engines having a same or very similar affinity scores may be assigned a workflow based on an amount of load carried by the two or more workflow engines (e.g., as between two or more workflow engines having a same affinity score based on number of physical resources, the workflow engine having a lighter load than the other workflow engines may be assigned a higher affinity score than the other workflow engines). At a block 612, after assigning affinity scores to the workflow engines for execution of the tasks needed to configure a given workload domain, the affinity-based workflow engine selector 220 notifies the workflow selector 206 associated with the workflow engine having the highest affinity score, by supplying the names of the workflows associated with implementing the workload domain to the workflow selector 206. In some such examples, the workflows associated with implementing a workload domain can be stored in the workflow domain storage 204. At a block 614, the affinity-based workflow engine selector 220 supplies the affinity scores that have been assigned to the other workflow engines for purposes of implementing the workload domain to the workflow engine selector 228 of the status tracker 122a. The status tracker 122a causes the affinity scores and corresponding workflow engine identifiers to be stored in the example workflow engine selector affinity score storage 227 for use in selecting a different workflow engine to be assigned to complete the workflows associated with implementing the workload in the event that the server on which the workload engine currently executing the workflows becomes inoperable. After the affinity scores have been supplied to the status tracker 122a, the program ends.

Figure 7:
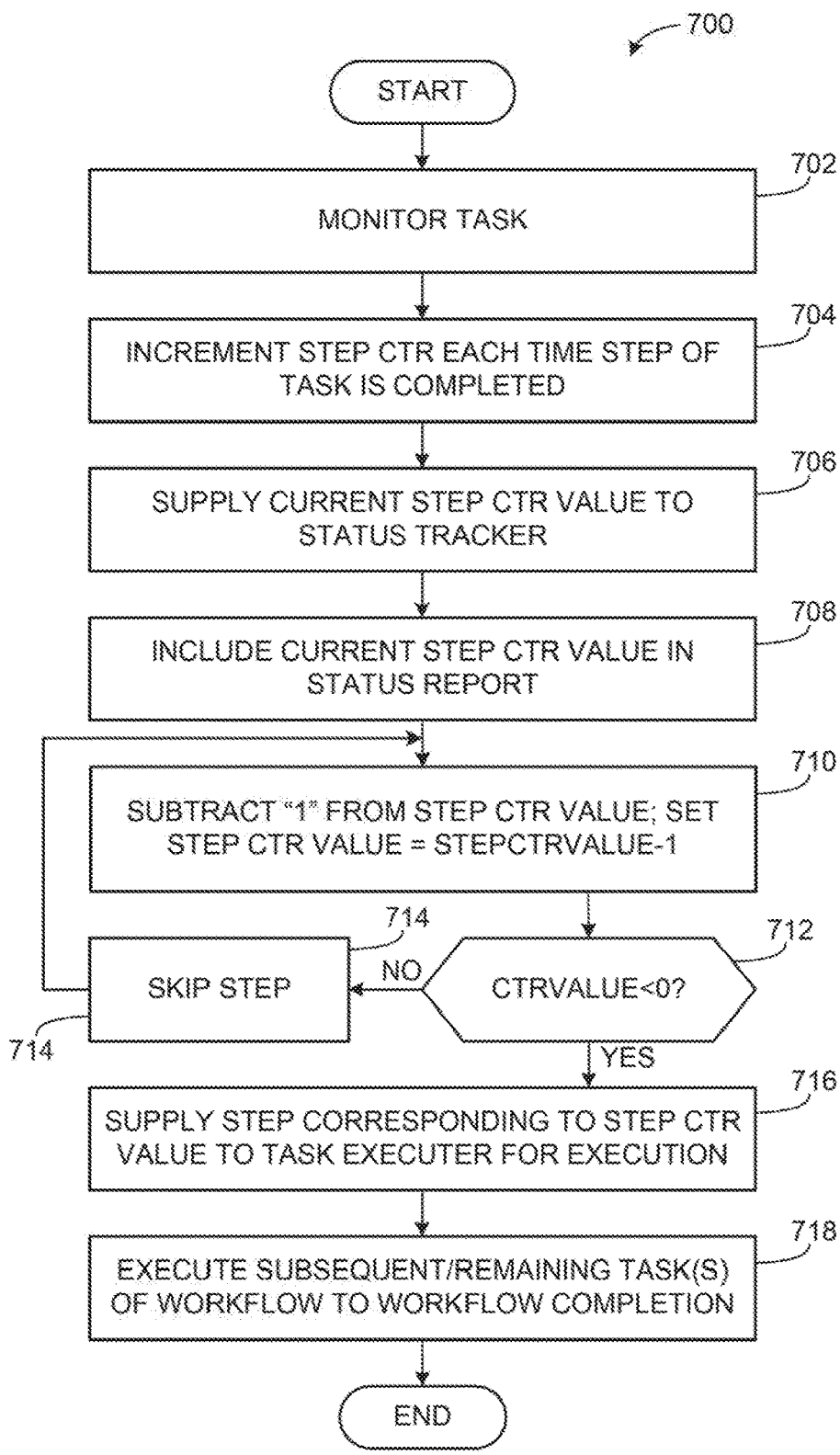
FIG. 7 is a flowchart representative of example computer readable instructions that can be executed to implement the example SDDC manager and the example status tracker of FIG. 1.

Example machine readable instructions 700 that may be executed to implement any of the example SDDC managers 118a, 118b, 118n and any of the example status trackers 122a, 122b, 122n of FIGS. 1 and 2 are represented by the flowchart shown in FIG. 7. The example machine readable instructions 700 may be executed periodically and/or aperiodically (e.g., at predetermined intervals, based on an occurrence of a predetermined event, etc., or any combination thereof). The machine readable instructions 700 begin execution at block 702 of FIG. 7 at which the example step tracker 232 of the workflow engine 120a monitors the tasks performed by the task executor 218. At a block 704, the step tracker 232 increments a value stored in the example step counter storage 233 (which is initialized to contain a zero before each task is performed) by one each time a step is successfully performed. At a block 706, the step tracker 232 supplies the value currently stored in the step counter to the example first task status reporter/collector 216 for delivery to the example second task status reporter/collector 224 of the example status tracker 122a. At a block 708, the second task status reporter/collector 224 causes the current value of the step counter to be included in the status report 225 stored in the status report storage 226. A block 710 occurs when (and if) execution of the workflow is taken over by a different workflow engine (e.g., the workflow engine 120b), due to the failure of the first workflow engine 120B. Due to the failure of the first workflow engine 120B whilst in the middle of a set of steps included in a task, the task selector 222 of the workflow engine 120b subtracts one from the step counter value included in the status report 225 and, at a block 712, compares the result to zero. If the result is less than zero, the step corresponding to the result is skipped (e.g., not executed by the task executor 218) at a block 714 because the step was previously performed successfully by the workflow engine 120A. If the result is greater than or equal to zero thereby indicating that the step was not previously performed by the workflow engine 120A, the task selector 222 of the workflow engine 120b supplies the step corresponding to the result (and any subsequent steps) to the task executor 218 of the workflow engine 120b for execution, at a block 716. Thereafter the remaining steps/tasks of the workflow are completed/executed by the workflow engine 120b at the block 718, and the program ends. Thus, the step tracker 122a allows a second workflow engine that takes control of a workflow (after failure of a first workflow engine) to identify which steps of a task were successfully completed thereby preventing the second workflow engine 120b from re-performing steps that were already successfully completed.

Figure 8:
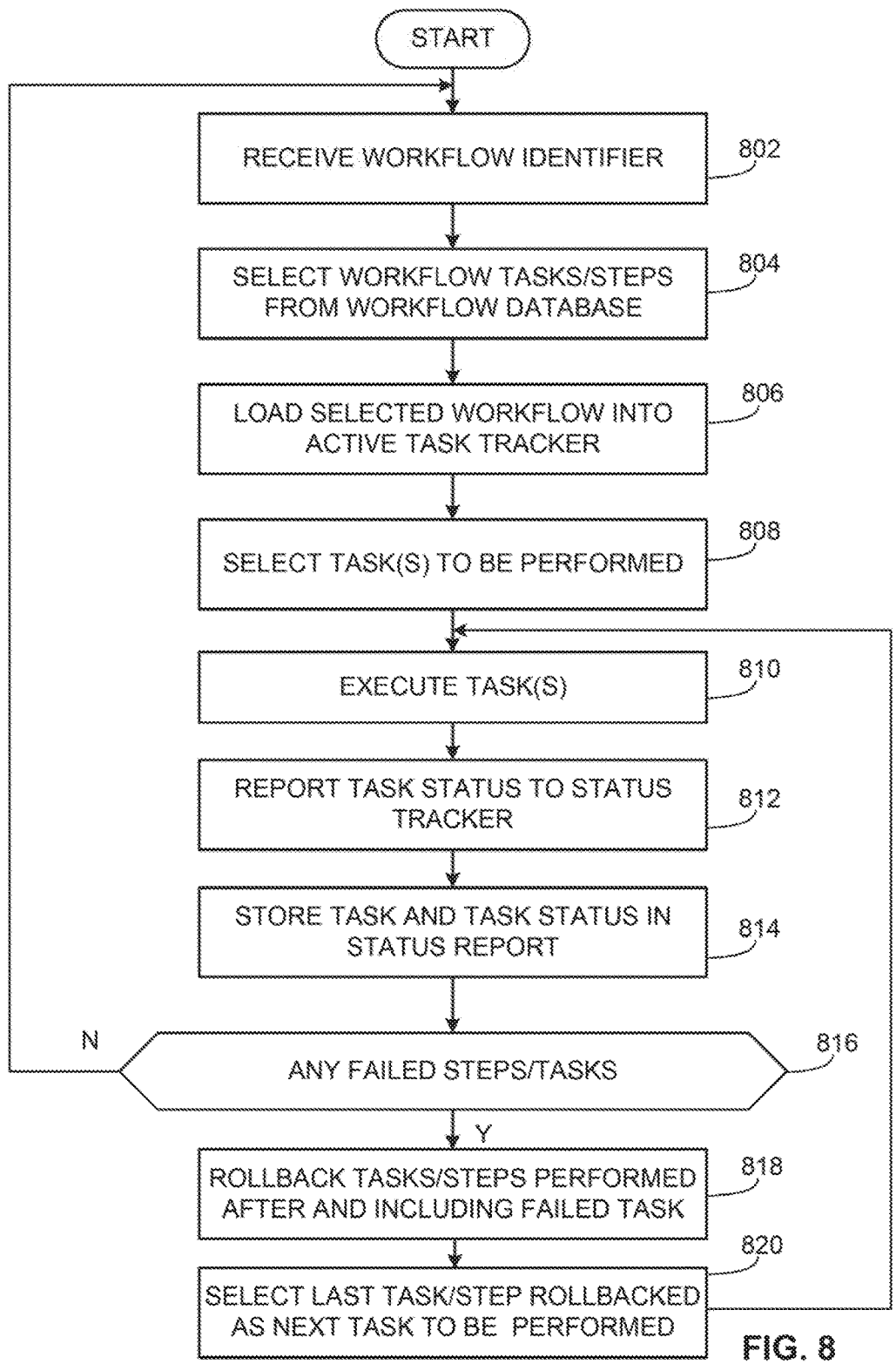
FIG. 8 is a flowchart representative of example computer readable instructions that can be executed to implement the example SDDC manager of FIG. 1.

Example machine readable instructions 800 that may be executed to implement the example SDDC managers 118a, 118b, 118n of FIGS. 1 and 2 are illustrated by the flowchart shown in FIG. 8. The example machine readable instructions 800 may be executed periodically and/or aperiodically (e.g., at predetermined intervals, based on an occurrence of a predetermined event, etc., or any combination thereof). The machine readable instructions 800 begin execution at a block 802 of FIG. 3 the example workflow selector 206 receives a workflow identifier/name from the example configuration tool 202. At a block 804, the example workflow selector 206 uses the workflow identifier/name to identify a corresponding set of workflow tasks/steps, as well as information concerning the execution of the tasks, from the example workflow database 208. At a block 806, the workflow selector 206 causes the tasks and information concerning the execution of the tasks to be stored in the active task tracker 210, n some examples, the workflow selector additionally assigns an initial status of "not yet started" to each task upon storage in the active task tracker 210. At a block 808, the example task selector 222 accesses the active task tracker 210 to select a first of the tasks to be executed (or multiple tasks in the list of tasks, provided that parallel execution of such multiple tasks is permitted). The task selector 222 supplies the task(s) to the example task executor 218 which causes the task(s) to be executed at a block 810. When performing, for example, a task related to deploying virtual machines and/or virtual machine management tools, the task executor 218 can access an appropriate one of a set of virtualization files (e.g., open virtualization files having a ".ovf" extension) stored in the example virtualization file storage 219. At a block 812, the task executor 218 supplies information identifying the status of the performed task(s) (e.g., successful, unsuccessful, partially successful, etc.) to the example first task status reporter/collector 216 which transmits the information to the second task status reporter/collector 224 of the status tracker 122a. At a block 814, the task information and task status information supplied by the workflow engine 120a is used by the second task status reporter/collector to update the example status report 225 residing in the example task status report storage 226. At a block 816, the task executor 218 reviews the status of all executed tasks included in the active task tracker 210 to determine whether any of the tasks failed. If none of the tasks/steps failed, the workflow is complete and the program obtains another workflow identifier (block 802) and execution of that workflow proceeds in the manner described above with respect to blocks 802-814. In some examples, if one or more of the tasks failed (as determined at the block 816), the task executor 218 rolls back all tasks/steps (in reverse order) of the workflow that were executed after the failed task/step and also rolls back the failed task/step at a block 818. In some examples, the task executor 218 rolls back all of the tasks/steps of the workflow in reverse order at the block 818. After the workflow tasks/steps have been rolled back, the task executor 218 selects the last rolled back (previously failed) step/task as the next task to be selected at a block 820, and the program returns to the block 810 and blocks subsequent thereto and the program proceeds in the manner described above.

Figure 9:
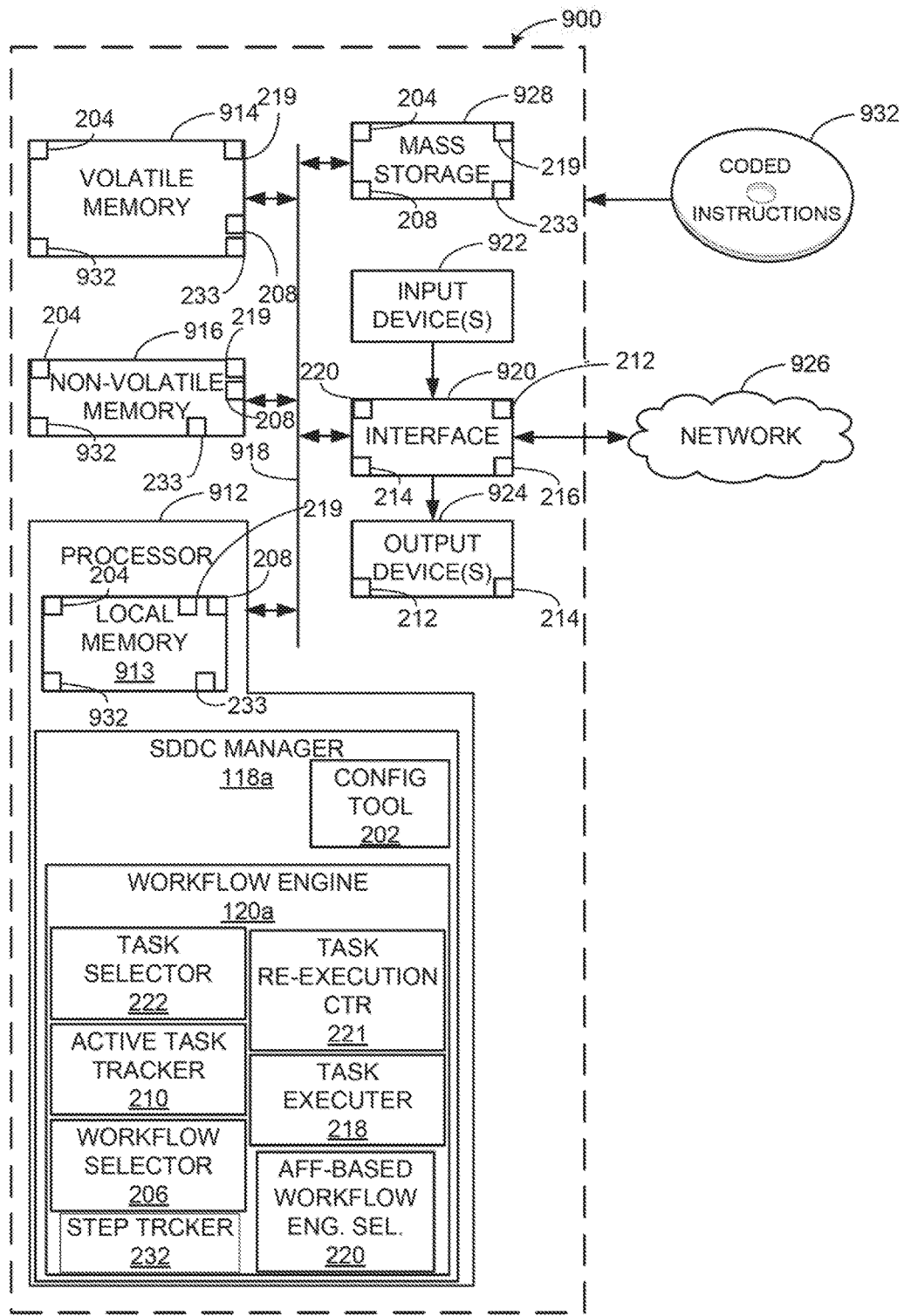
FIG. 9 is a block diagram of an example processing system that may execute example machine readable instructions of FIGS. 3-7 to implement the example SDDC manager of FIG. 1 and/or FIG. 2.

FIG. 9 is a block diagram of an example processor platform 900 capable of executing the instructions of FIGS. 3-7 to implement any of the example SDDC managers 118a, 118b, . . . , 118n, the example configuration tool 202, the example workload domain storage 204, the example workflow engine 120a, 120b, . . . , 120n, the example workflow selector 206, the example workflow database 207, the example workflow database storage 208, the example active task tracker 210, the example message generator 212, the example workflow engine communicator 214, the example first status reporter/collector 216, the example task executor 218, the example virtualization file storage 219, the example affinity-based workflow engine selector 220, the example task re-execution counter 221, the example task selector 222, the example step tracker 232, the example step counter storage 233, and/or the example communication bus 234 of FIGS. 1 and 2. The processor platform 900 can be, for example, a server, a personal computer, an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The processor 912 can be used to implement the example SDDC managers 118a, 118b, . . . , 118n, the example configuration tool 202, the example workflow engine 120a, 120b, . . . , 120n, the example workflow selector 206, the example active task tracker 210, the example message generator 212, the example task executor 218, the example affinity-based workflow engine selector 220, the example task re-execution counter 221, the example task selector 222, and/or the example step tracker 232 of FIGS. 1 and 2

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller. Any of the random access memory device 914 and the mass storage 928 can be used to implement the example step counter storage 233, the example workflow domain storage 204, the example workflow database storage 208, and/or the example virtualization file storage 219 of FIG. 2.

The processor platform 900 of the illustrated example also includes an interface circuit 920. The interface circuit 920 may be implemented by any type of interface standard, such as an Ethernet interface, a universal serial bus (USB), and/or a PCI express interface. The interface circuit 920 can be used to implement the example communication bus 234 of FIG. 2.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.). The interface circuit 920 can be used to implement any of the example workflow engine communicator 214 and the example first task status reporter/collector 216, the example message generator 212, and/or the example affinity-based workflow selector 220.

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives. In some examples, the mass storage 928 can be used to implement the example step counter storage 233, the example workflow domain storage 204, the example workflow database storage 208, and/or the example virtualization file storage 219 of FIG. 2.

The coded instructions 532 of FIG. 3-7 may be stored in the mass storage device 928, in the volatile memory 914, in the non-volatile memory 916, and/or on a removable tangible computer readable storage medium such as a CD or DVD.

Figure 10:
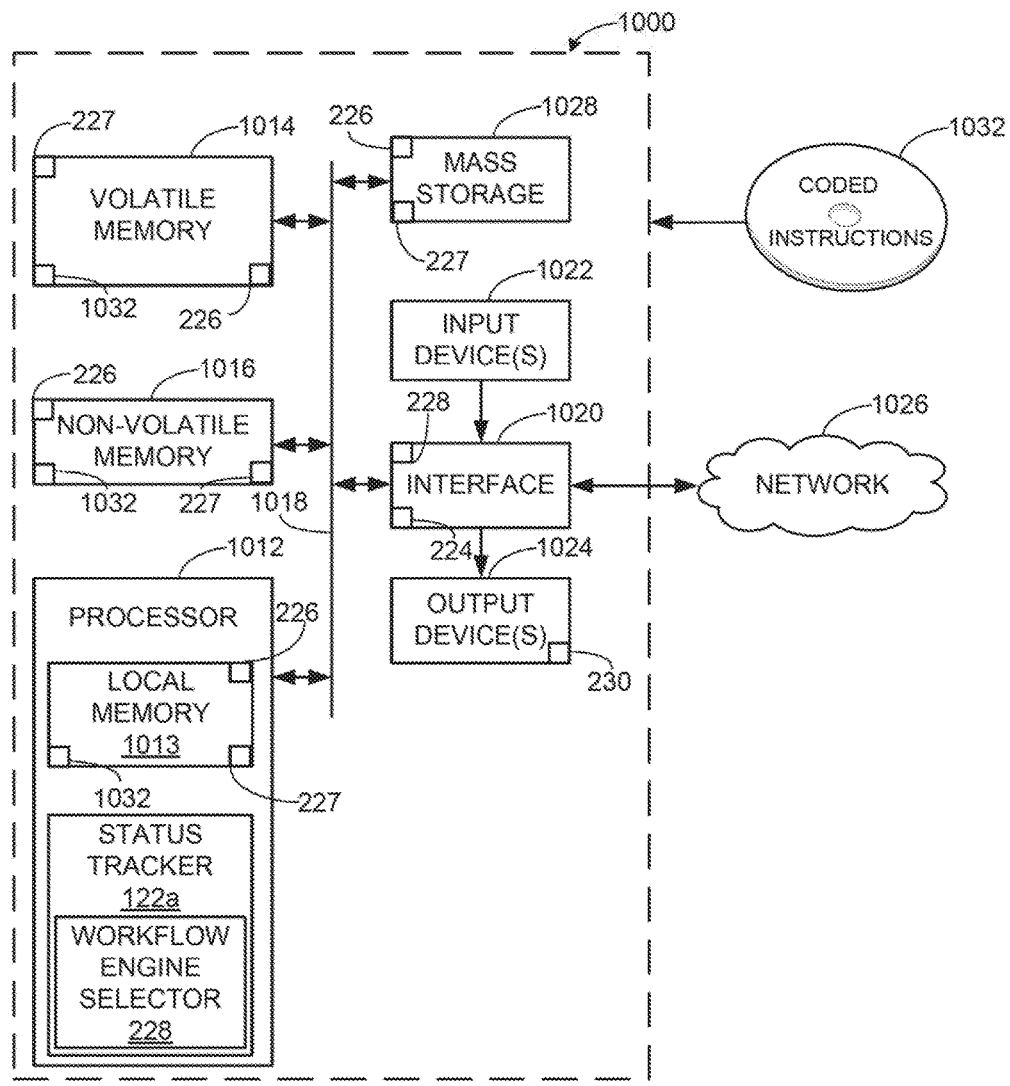
FIG. 10 is a block diagram of an example processing system that may execute example machine readable instructions of FIGS. 3 and 6 to implement the example status tracker of FIG. 1 and/or FIG. 2.

FIG. 10 is a block diagram of an example processor platform 1000 capable of executing the instructions of FIGS. 3, and 6 to implement the example status tracker 122*a*, 122*b*, . . . , 122*n*, the example second task status reporter/collector 224, the example status report 225, the example status report storage 226, the example workflow engine selector 228, and/or the example monitor(s) 230 of FIGS. 1 and 2. The processor platform 1000 can be, for example, a server, a personal computer, an Internet appliance, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. The processor 1012 can be used to implement the example status tracker 122*a*, 122*b*, . . . , 122*n*, the example second task status reporter/collector 224, the example workflow engine selector 228, and/or the example monitor(s) 230 of FIGS. 1 and 2.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller. Any of the random access memory device 1014 and the mass storage 1028 can be used to implement the example status report storage 226, and/or the workflow engine selector affinity storage 227 of FIG. 2.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 520 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.). The interface circuit 1020 can be used to implement the example task status reporter/collector 224 of FIG. 2.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives. In some examples, the mass storage 1028 can be used to implement the status report storage 226, and the workflow engine selector affinity storage 227 of FIG. 2.

The coded instructions 1032 of FIG. 3 and FIG. 6 may be stored in the mass storage device 1028, in the volatile memory 1014, in the non-volatile memory 1016, and/or on a removable tangible computer readable storage medium such as a CD or DVD.

From the foregoing, it will be appreciated that the above disclosed methods, systems, apparatus and articles of manufacture provide advantages in the area of software defined data center and, more particularly, in the area of software defined data centers that support virtual machines, storage and networks using physical devices that span across multiple physical racks. For example, the example software defined data center disclosed herein includes a distributed software defined data center manager that is implemented using multiple instances of the software defined data center manager, each installed on a server in one of the physical racks. The multiple instances of the software defined data center manager are each able to perform workflows related to provisioning, deploying, and configuring a workload domain and/or related to provisioning, deploying and configuring virtual management tools. In some examples, the workflows are assigned to be performed by the instances of the software defined data center manager installed on the racks based on a number of physical resources installed on a same rack that will be affected by the workflow. As a result, the workflow operations can be performed, to great extent, by a workflow engine that is local to (e.g., installed on the same rack) as the resources being configured by the workflow operations. Also, files used to install the virtual machines (e.g., open virtualization format files having a ".ovf" extension) and that are used by the SDDC manager to provision, deploy and configure a workload domain are stored locally on each rack. Locally performing the workflow operations in this manner and storing the virtual machine files on each rack, greatly reduces the amount of time required to perform the workflows by reducing, and in some cases eliminating, the amount the remote file/procedure invocation. Further, a workflow status that identifies the status of each of the tasks/activities included in a workflow is maintained on a different server than the server performing the workflow. Thus, if the server performing the workflow fails (or if the workflow fails for any reason), a workflow engine installed on another rack is selected to continue the workflow based on the workflow status. As a result, the workflow engines have high availability. Additionally, any workflow steps that must be performed on a rack other than the local rack are routed to the workflow engine on the rack on which the workflow steps are to be performed. For example, connectivity to the some rack devices including top of the rack ("ToR") switches and spine switches is only available to locally (on same rack) disposed software/devices (i.e., to software/devices residing on the same physical rack). Thus, workflow tasks/steps to configure such switches can be selectively transferred to the rack on which such switches are installed. In this manner, the workflow engine that performs any set of workflow steps can be selected based on suitability for such tasks. Lastly, the status of the workflow tasks that include multiple steps are specially tracked so that, if a workflow engine fails, the workflow can be performed by a different workflow engine and the different workflow engine can use the special tracking to avoid inadvertently re-executing steps that were already successfully completed. Skipping steps that were already successfully completed reduces configuration errors that would result if a previously successful step were to be executed twice.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A software defined data center comprising:
a first workflow engine associated with a first processor to:
execute a workflow to implement a workload domain within the software defined data center;
generate status information identifying a status of tasks included in the workflow;
upon failure of a first one of the tasks included in the workflow, roll back a second one of the tasks included in the workflow that executed after the failure of the first one of the tasks; and
after rolling back the second one of the tasks, re-execute the first one of the tasks;
a status tracker associated with a second processor, the status tracker to collect and store the status information; and
a second workflow engine associated with a third processor, the second workflow engine to execute the workflow in response to a signal from the status tracker indicating the first processor failed to re-execute the first one of the tasks, the second workflow engine to begin executing the workflow at a stage associated with the first one of the tasks identified in the status information collected and stored by the status tracker.

2. The software defined data center of claim 1, wherein the workflow is a first workflow of a plurality of workflows, the software defined data center further including: a workflow engine selector, the workflow engine selector to assign one or more of the plurality of workflows to one of the first workflow engine or the second workflow engine based on respective affinity scores associated with the first and second workflow engines.

3. The software defined data center of claim 2, wherein a first affinity score assigned to the first workflow engine relative to the first workflow is based on a proximity of the first workflow engine to a set of physical resources used to implement the workload domain associated with the first workflow.

4. The software defined data center as defined in claim 1, wherein the status tracker is a first status tracker, the software defined data center further including a second status tracker associated with a fourth processor, the first and second status trackers to collect and store status information generated by the first workflow engine and the second workflow engine.

5. The software defined data center as defined in claim 1, wherein the first workflow engine, after rolling back the second one of the tasks, is to automatically attempt re-execution of the first one of the tasks until at least one of 1) the first one of the tasks is performed successfully, or 2) a threshold number re-executions have been attempted.

6. The software defined data center as defined in claim 1, wherein the first workflow engine includes a subtask tracker to track a number of successfully executed subtasks associated with a first task, and wherein the status tracker is to collect and store the number of successfully executed subtasks, and when the status information indicates the first workflow engine completed at least some but not all of the subtasks of the first task, the second workflow engine, when executing the workflow, obtains the number of successfully executed subtasks from the status tracker and skips a number of subtasks in the first task equal to the number of successfully executed subtasks.

7. The software defined data center as defined in claim 1, wherein the first workflow engine is to determine whether a first task in the workflow is to be performed by the second workflow engine, and based on determining that the first task is to be performed by the second workflow engine, the first workflow engine is to cause the first task to be performed by the second workflow engine.

8. The software defined data center as defined in claim 1, the software defined data center further including:
- a plurality of physical racks, the first and second processors being installed in a first rack of the plurality of physical racks, and
- a fourth processor installed in a third rack of the software defined data center, the fourth processor to determine that a set of physical resources of the software defined data center is to implement the workload domain, and that the set of physical resources is installed on the first rack and, based on determining that the set of physical resources to implement the workload domain is installed in the first rack, the fourth processor is to assign the workflow to be performed by the first workflow engine.

9. A method to perform a workflow in a software defined data center, the method comprising:
- performing, by executing an instruction at a first processor of the software defined data center, one or more of a set of tasks of the workflow, the workflow to implement a workload domain within the software defined data center;
- upon failure of a first one of the tasks included in the one or more of the set of tasks, rolling back, by executing an instruction at the first processor, a second one of the tasks included in the one or more of the set of tasks that executed after the failure of the first one of the tasks;
- after rolling back the second one of the tasks, re-executing, by executing an instruction at the first processor, the first one of the tasks;
- causing, by executing an instruction with a second processor, status information generated by the first processor to be stored in a storage associated with the second processor, the status information identifying a status of the one or more of the set of tasks of the workflow; and
- in response to a signal from the second processor indicating that the first processor failed before performing all of the set of tasks of the workflow, executing the set of tasks on a third processor at a stage associated with the first one of the tasks identified in the status information provided by the second processor.

10. The method as defined in claim 9, the storage being a first storage, the method further including causing the status information to be stored in a second storage associated with a fourth processor.

11. The method as defined in claim 9, wherein the first processor is determined to have failed while performing the first one of the tasks included in the one or more of the set of tasks, the method further including:
- determining a number of subtasks executed while performing the first one of the tasks included in the one or more of the set of tasks; and
- in response to determining that the first processor failed while performing the first one of the tasks, using the number of subtasks executed to identify a next subtask of the first one of the tasks to be executed by the third processor.

12. The method as defined in claim 9, further including:
- when the status information indicates the first one of the tasks of the one or more of the set of tasks performed by the first processor did not successfully execute, causing the first processor to automatically attempt re-execution of the first one of the tasks until at least one of 1) the first one of the tasks is performed successfully, or 2) a threshold number re-executions have been attempted.

13. The method as defined in claim 9, the method further including:
- determining, by executing an instruction at the first processor, that the first one of the tasks in the one or more of the set of tasks is to be performed on a fourth processor installed in a third server rack of the software defined data center; and
- based on the determining that the first one of the tasks is to be performed on the third processor, causing the first one of the tasks to be performed at the fourth processor.

14. The method as defined in claim 9, the method further including:
- determining, by executing an instruction with a fourth processor that a set of physical resources to implement the workload domain is installed on a first server rack of the software defined data center; and
- based on the determining that the set of physical resources to implement the workload domain is installed in the first server rack, assigning the workflow to be performed on the first processor.

15. The method as defined in claim 14, wherein the set of physical resources is a first set of physical resources, the method further including:
- determining, by executing an instruction with the fourth processor, that a second set of physical resources to implement the workload domain is installed in a fourth server rack of the software defined data center; and
- comparing a first amount of the first set of physical resources to a second amount of the second set of physical resources, wherein assigning of the one or more the set of tasks to the first processor is based on a determination that the first amount of the first set of physical resources is greater than the second amount of the second set of physical resources.

16. The method of claim 9, wherein the workflow is a first workflow of one or more workflows including at least a second workflow, the method further including:
- assigning a first affinity score to the first processor and a second affinity score to the second processor; and
- based on a comparison of the first affinity score and the second affinity score, selecting the first processor to begin executing the first workflow.

17. The method of claim 16, wherein the first affinity score and the second affinity score are based on a proximity of the first workflow and the second workflow, respectively, to a set of physical resources used to implement the workload domain associated with the first workflow.

18. A non-transitory computer readable medium comprising instructions which, when executed, cause a first machine of a software defined data center to at least:
- collect status information identifying a status of tasks included in a workflow, the workflow to implement a workload domain within the software defined data center, the status information generated by a first workflow engine executing the workflow;
- determine failure of a first one of the tasks to be executed by the first workflow engine while performing the workflow; and
- in response to determining failure of the first workflow engine to successfully re-execute the first one of the tasks after rolling back a second one of the tasks included in the workflow, send a signal indicating the first workflow engine failed to re-execute the first one of the tasks and the status information to a second workflow engine for use in performing unexecuted portions of the workflow beginning at a stage associated with the first one of the tasks identified in the status information.

19. The non-transitory computer readable medium as defined in claim 18, wherein the status information is first status information and the workflow is a first workflow, the instructions further to cause the first machine to synchronize the first status information with second status information collected from a second machine, the second status information being generated by the second workflow engine performing a second workflow.

20. The non-transitory computer readable medium as defined in claim 18, wherein the second workflow engine is to identify the unexecuted portions of the workflow based on the status information.

* * * * *